(12) United States Patent
Reyes et al.

(10) Patent No.: US 10,104,570 B2
(45) Date of Patent: Oct. 16, 2018

(54) DYNAMIC MODIFICATION OF THE TRACKING AREA UPDATE PERIOD FOR MACHINE-TO-MACHINE COMMUNICATION

(71) Applicant: Verizon Patent and Licensing Inc., Arlington, VA (US)

(72) Inventors: Emerando Delos Reyes, Pleasant Hill, CA (US); Wing-Cheong V. Yeung, San Ramon, CA (US); Priscilla Lau, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 193 days.

(21) Appl. No.: 14/724,666

(22) Filed: May 28, 2015

(65) Prior Publication Data

US 2016/0353313 A1   Dec. 1, 2016

(51) Int. Cl.
*H04W 28/02* (2009.01)
*H04W 60/02* (2009.01)
*H04W 4/70* (2018.01)
*H04L 12/807* (2013.01)

(52) U.S. Cl.
CPC ......... *H04W 28/0215* (2013.01); *H04L 47/27* (2013.01); *H04W 4/70* (2018.02); *H04W 28/0226* (2013.01); *H04W 60/02* (2013.01)

(58) Field of Classification Search
CPC .................... H04W 28/0215; H04W 4/005
See application file for complete search history.

(56) References Cited

U.S. PATENT DOCUMENTS

| | | | | |
|---|---|---|---|---|
| 8,861,527 B1* | 10/2014 | Bao | ................ | H04L 12/1836 370/392 |
| 2012/0059922 A1* | 3/2012 | Jason | ................ | H04L 12/14 709/223 |
| 2012/0208472 A1* | 8/2012 | Lee | ................ | H04W 60/02 455/68 |
| 2014/0204931 A1* | 7/2014 | Jain | ................ | H04W 52/0277 370/338 |

* cited by examiner

*Primary Examiner* — Michael Thier
*Assistant Examiner* — Zhensheng Zhang (57) ABSTRACT

The period for Tracking Area Update (TAU) requests, that are made by Machine-to-machine (M2M) User Equipment (UE) in a wireless cellular network, may be dynamically modified. In one implementation, the period for the TAU request may be dynamically increased for M2M UEs that tend to be stationary. Increasing the period at which M2M UEs initiate TAU requests with the wireless network can reduce the amount of control signaling that needs to be performed over the radio links.

20 Claims, 8 Drawing Sheets

DYNAMIC MODIFICATION OF THE TRACKING AREA UPDATE PERIOD FOR MACHINE-TO-MACHINE COMMUNICATION

The term "Machine-to-Machine (M2M) communications" refers to technologies that allow devices to communicate with one another over wired or wireless networks. An M2M device may include a sensor, meter, or other device that captures an "event" (temperature, inventory level, etc.), which is relayed through a network (wireless, wired, or hybrid) to an application that translates the captured event into meaningful information (e.g., items need to be restocked).

M2M devices may be configured to communicate using a wireless network, such as a wireless cellular network. Because the capacity of a wireless cellular network is often limited by the radio (air) links associated with the network, it may be desirable to minimize the load on the radio links of the wireless network.

DETAILED DESCRIPTION OF PREFERRED EMBODIMENTS

The following detailed description refers to the accompanying drawings. The same reference numbers in different drawings may identify the same or similar elements.

Techniques described herein may provide for dynamic modification of the period for Tracking Area Update (TAU) requests that are made by M2M User Equipment (UE) in a wireless cellular network. In one implementation, the period for the TAU request may be dynamically increased for M2M UEs that tend to be stationary. Increasing the period at which M2M UEs initiate TAU requests with the wireless network can reduce the amount of control signaling that needs to be performed over the radio links. This can be particularly beneficial in situations in which a large number of M2M UEs are deployed in a wireless network.

Figure 1A:
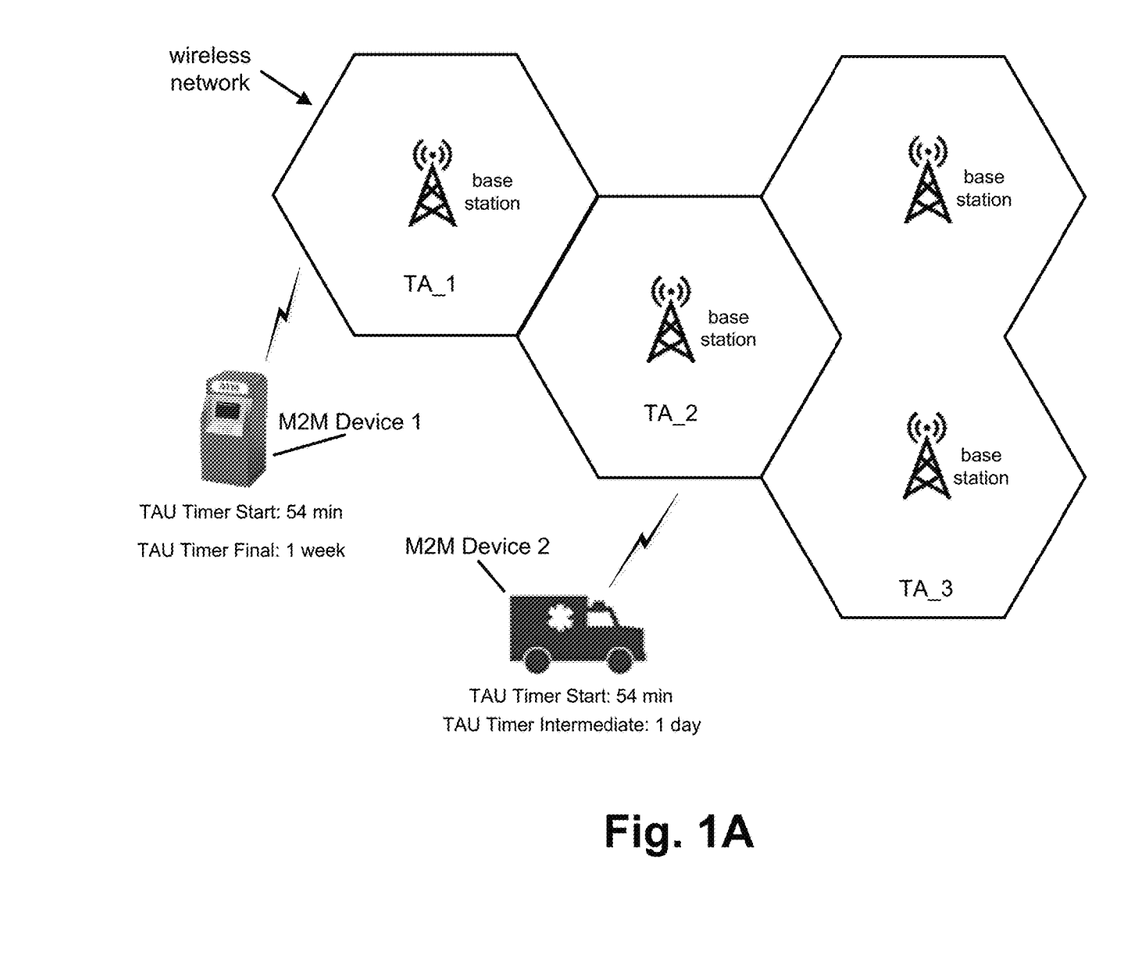
FIGS. 1A and 1B are diagrams conceptually illustrating an example of an overview of concepts described herein.
Figure 1B:
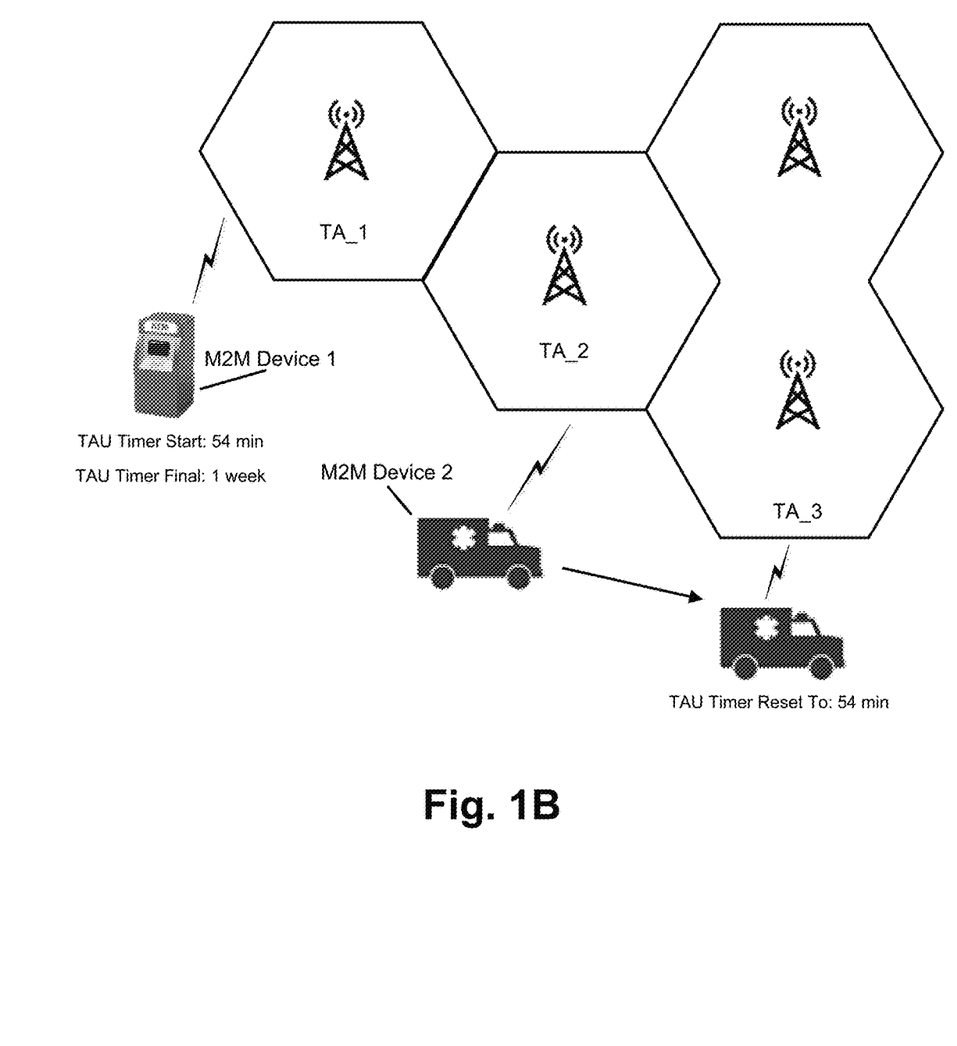

FIGS. 1A and 1B are diagrams conceptually illustrating an example of an overview of concepts described herein. As shown in FIG. 1A, M2M UEs, which may also be called "M2M devices" herein, may communicate with a cellular wireless network. The cellular wireless network may include base stations that are each associated with a wireless coverage area, shown as hexagons in FIGS. 1A and 1B. In one implementation, the wireless network may include a Long Term Evolution (LTE) network based on Third Generation Partnership Project (3GPP) specifications. In such a network, a TAU request may be used to notify the wireless network of UE availability and UE location relative to the physical network resources. For instance, when a UE is in an "active state, the location of the UE may be known at a network cell level (i.e., the UE may be associated with a particular base station or associated with a particular cell provided by a particular base station). However, when a UE is in an "idle" state, the location of the UE may be known at a less granular level than when the UE is in the active state. In particular, when in the idle state, the location of the UE may be known at the Tracking Area (TA) level. The network operator may define the TAs for the wireless network, and each TA may include the coverage area of one or more base stations. Typically, a TA, when defined by multiple base stations, may be defined such that the base stations are neighboring base stations.

Two M2M devices, labeled as M2M Device 1 and M2M Device 2, and three TAs, labeled as TA_1, TA_2, and TA_3 are shown in FIGS. 1A and 1B. M2M Device 1 and M2M Device 2 may be associated with TAU timer values. For example, in an LTE network, the "T3412 timer," as defined by 3GPP standards, may determine how often a UE transmits a TAU request to the network. The initial value (e.g., the default value) for the TAU timer may be set at 54 minutes (min). As shown at FIG. 1A, M2M Device 1 and M2M Device 2 are both associated with a "TAU Timer Start" value of 54 minutes. In this situation, M2M Device 1 and M2M Device 2, when in an idle state, may transmit, every 54 minutes, a TAU request to the wireless network. The TAU request may indicate to the network that the M2M device is still attached and is able to receive data from the wireless network.

Consistent with aspects described herein, M2M devices may be initially associated with a TAU timer value that is equal to the "normal" default value for UEs attached to the wireless network. M2M devices that remain relatively stationary, such as M2M devices that do not change TAs, may have the corresponding TAU timer values gradually increased by the wireless network. For example, in one implementation, if an M2M device remains relatively stationary for a week, the initial TAU timer value (e.g., 54 minutes) associated with the M2M device may be increased to 1440 minutes (24 hours). If the M2M device continues to stay stationary for a month, the TAU timer value associated with the M2M device may be increased to 10080 minutes (7 days). If, at any time, the M2M device changes TAs or otherwise moves to an extent that triggers initiation of a TAU request that is not based on expiration of the TAU timer value (e.g., the M2M moves TAs), the TAU timer for the M2M device may be reset to the default value.

As shown in FIG. 1A, assume that M2M Device 1 is attached to a base station that is associated with TA_1 and that M2M Device 2 is attached to a base station that is associated with TA_2. M2M Device 1 may be included within a vending machine, automated teller machine, or other M2M device that changes locations relatively infrequently (or not at all). M2M Device 2 may be included within a vehicle that changes locations relatively frequently. When M2M Device 1 and M2M Device 2 are initially installed or provisioned (e.g., when radio terminals associated with the devices attach to the wireless network), the TAU timer for the devices may be set to the default value (such as the general value that is used by UEs and is determined by the network operator).

Assume that M2M Device 1 remains stationary. The wireless network may log TAU requests from M2M Device 1 and analyze the log. Based on the analysis (i.e., based on determining that M2M Device 1 has remained in the same TA, TA_1), the network may determine to increase the TAU timer value for M2M Device 1. For example, the TAU requests from M2M Device 1 may be initially increased from 54 minutes to 24 hours, and then from 24 hours to one week. In this manner, radio control traffic associated with M2M Device 1 (i.e., radio traffic relating to the TAU requests) may be decreased.

Assume that the M2M Device 2 initially remains stationary. For example, the vehicle associated with M2M Device 2 may remain on a dealer's lot or may otherwise be parked. The wireless network may log TAU requests from M2M Device 2 and analyze the log. Based on the analysis, the wireless network may initially determine to increase the TAU timer value for M2M Device 2 from the 54 minutes to 1 day (e.g., based on determining that M2M Device 2 has remained in the same TA for an extended length of time). At some point, M2M Device 2 may move to a different TA (e.g., when the vehicle associated with M2M Device 2 is purchased by a customer). For example, as shown in FIG. 1B, M2M Device 2 may attach to a base station associated with TA_3. The movement may cause M2M Device 2 to initiate a TAU request with the wireless network (i.e., a TAU request not based on expiration of the TAU timer). Based on this request, the wireless network may determine to reset the TAU timer value for M2M Device 2 to the default value (e.g., 54 minutes).

Figure 2:
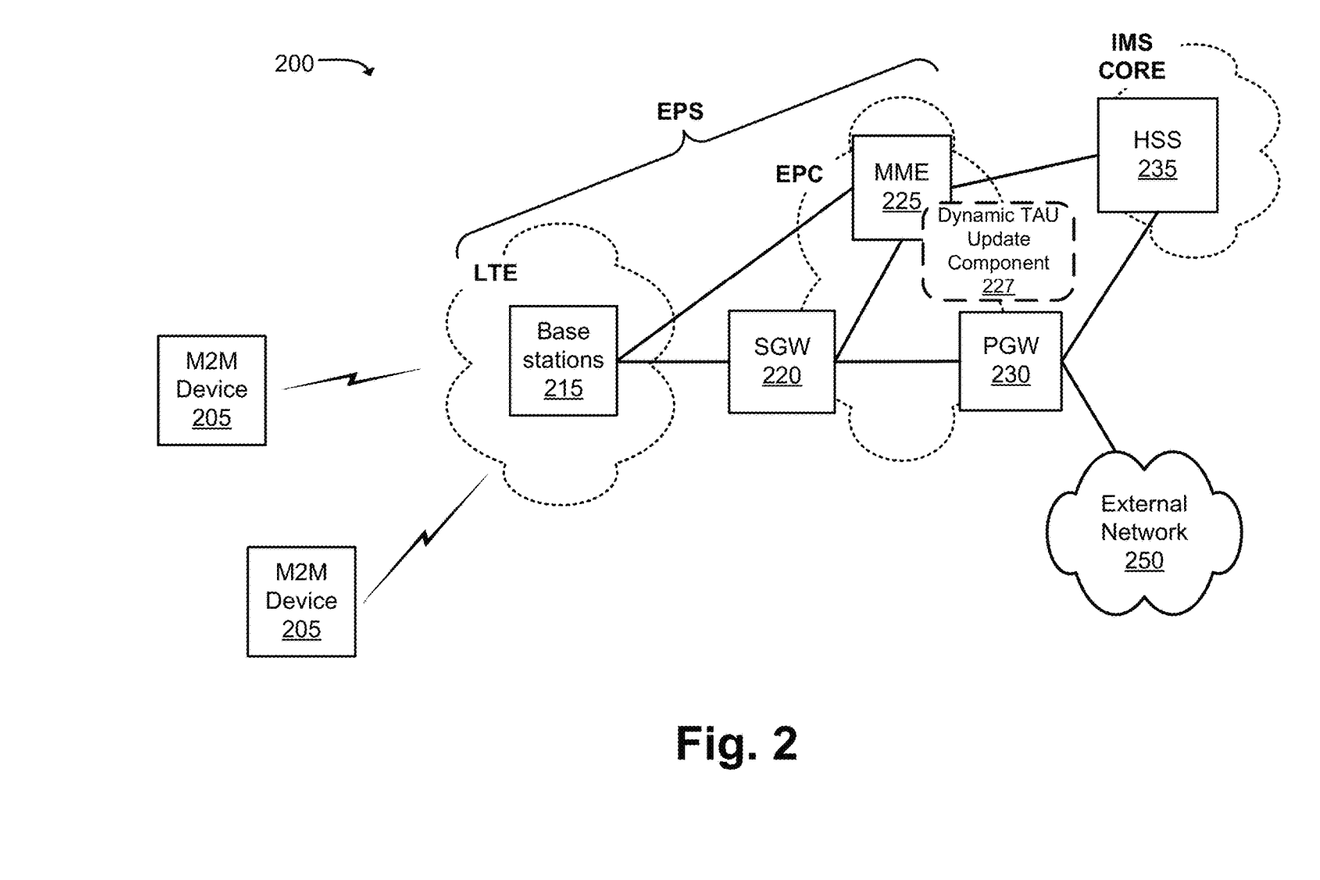
FIG. 2 illustrates an example environment in which systems and/or methods described herein may be implemented.

FIG. 2 illustrates an example environment 200, in which systems and/or methods described herein may be implemented. As shown in FIG. 2, environment 200 may include one or more M2M devices 205, one or more base stations 215, serving gateway (SGW) 220, mobility management entity device (MME) 225, packet data network gateway (PGW) 230, home subscriber server (HSS) 235, and external network 250.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system (EPS) that includes an LTE network and/or an evolved packet core (EPC) network that operate based on a third generation partnership project (3GPP) wireless communication standard. The LTE network may be, or may include, a radio access network (RAN) that includes one or more base stations 215, some or all of which may take the form of an evolved Node B (eNodeB), via which UEs (e.g., M2M devices 205) may communicate with the EPC network. The EPC network may include one or more SGWs 220, MMEs 225, and/or PGWs 230, and may enable user device 205 to communicate with external network 250 and/or an IP multimedia subsystem ("IMS") core network. The IMS core network may include HSS 235, and may manage authentication, session initiation, account information, a user profile, etc. associated with UEs.

M2M devices 205 may each include any computation and communication device, such as a wireless mobile communication device that is capable of communicating with one or more networks (e.g., external network 250 and/or the IMS core). M2M devices 205 may be designed to communicate with one another or with an external server (e.g., a server connected to external network 250) without human intervention. M2M devices 205 may include sensors, meters, Global Positioning System (GPS) logic, or other devices that capture environmental data or other data. M2M devices 205 may be designed to connect to base stations 215, of the EPS, to communicate the sensed/measured data. In one possible implementation, an M2M device 205, in addition to including a radio to connect to base stations 215, may include one or more additional radios designed to communicate with other nearby M2M devices via relatively short range wireless connections. For example, one M2M device 205 may be designated as a "coordinator" or "gateway" M2M device that receives data directly from nearby M2M devices and uploads the received data to the EPS. In this manner, M2M devices 205 in proximity of one another may connect to form local M2M networks, which may communicate with the wireless cellular network using one or more gateway M2M devices 205.

Each of base stations 215 may include one or more network devices that receive, process, and/or transmit traffic, such as calls, audio, video, text, and/or other data, destined for and/or received from M2M devices 205. In one example, base stations 215 may each include an eNodeB device and may be part of the LTE network. Base stations 215 may receive traffic from and/or send traffic to external network 250 via SGW 220 and PGW 230. Base stations 215 may send traffic to and/or receive traffic from M2M devices 205 via an air (radio) interface. Base stations 215 may be logically arranged into TAs, in which each TA includes one or more base stations. In some implementations, a base station may include multiple radios that may be used to create multiple communication "cells." TAs may also be defined on a per-cell basis. For clarity, TAs will generally be discussed herein has been defined as corresponding to one or more base stations 215, although it can be appreciated that concepts described herein also apply to TAs defined as corresponding to one or more cells.

SGW 220 may include one or more network devices that aggregate traffic received base stations 215 and/or from other devices. SGW 220 may generally handle user (data) plane traffic. SGW 220 may, for example, aggregate traffic received from one or more base stations 215 and may send the aggregated traffic to external network 250 via PGW 230.

MME 225 may include one or more computation and communication devices that perform operations to register M2M devices 205 with the EPC, establish bearer channels associated with a session with M2M devices 205, hand off M2M devices 205 from one cell or eNodeB to another, and/or perform other operations. MME 225 may generally handle control plane traffic.

TAU requests, that are generated by M2M devices 205, may be received and processed by MME 225. The TAU requests may be used, by the wireless network, to keep track of location of UEs (e.g., M2M devices 205) relative to the connectivity of the UEs (e.g., to which eNodeB the device is connected, to which gateways the device are registered, etc.).

As previously mentioned, TAU requests may be periodically generated by M2M devices 205 based on the expiration of the TAU timer (i.e., the 3GPP T3412 timer) or based on the movement of an M2M device 205, such as movement of M2M device 205 that causes a handover to a new eNodeB or TA. The TAU timer value may be transmitted, by the wireless network, to M2M devices 205, via either: 1) an ATTACH ACCEPT message, or 2) a TRACKING AREA UPDATE ACCEPT message. When M2M device 205 sends a TAU request, the TAU timer may be stopped and then reset with a TAU timer value that is received from the wireless network (e.g., from MME 225) as part of the TRACKING AREA UPDATE ACCEPT message that may be transmitted in response to the TAU request. In general, the value of the TAU timer can be arbitrarily configured, shortened or extended, and can also be set to zero. A value of zero for the TAU timer may indicate that M2M device 205 will not send periodic TAU requests.

As is further shown in FIG. 2, MME 225 may include or may be associated with dynamic TAU update component 227. Dynamic TAU update component 227 may be implemented as, for example, a software process that executes at MME 225 or as another component (e.g., server or other network device) in the wireless network. Dynamic TAU update component 227, as will be described in more detail below, may generally operate to modify the value of the TAU timer for M2M devices that tend to remain stationary in the wireless network.

PGW 230 may include one or more devices that act as the point of interconnect between the EPC and external IP networks, such as external network 250, and/or operator IP services. PGW 230 may route packets to and from the access networks and the external IP networks.

HSS 235 may include one or more server devices, or other types of devices, that gather, process, search, store, and/or provide information. For example, HSS 235 may manage, update, and/or store, in a memory associated with HSS/SPR 235, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; an indication of whether a subscriber is an M2M device, and/or other information. Additionally, or alternatively, HSS 235 may perform authentication, authorization, and/or accounting operations.

External network 250 may include an Internet Protocol (IP)-based network or other network. For example, external network 250 may include a local area network (LAN), a wide area network (WAN), a metropolitan network (MAN), an intranet, the Internet, a fiber optic-based network, and/or a combination of these or other types of networks. External network 250 may include, or be associated with, a number of computing devices, such as a server designed to communicate with M2M devices 205.

Figure 3:
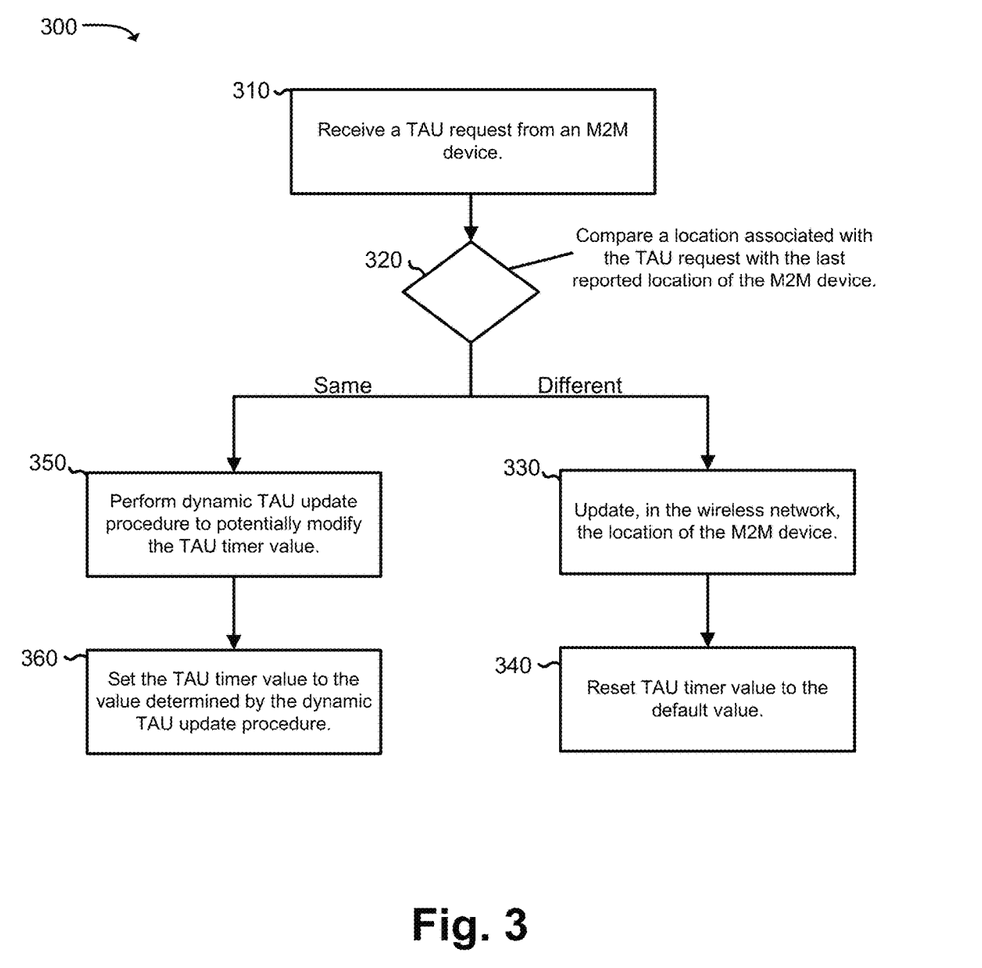
FIG. 3 is a flow chart illustrating an example process for updating the value of Tracking Area Update (TAU) timers that are associated with M2M devices.

FIG. 3 is a flow chart illustrating an example process 300 for updating the value of TAU timers that are associated with M2M devices 205. Process 300 may be performed, for example, by one or more components associated with the wireless network, such as by dynamic TAU update component 227.

Process 300 may include receiving a TAU request from an M2M device (block 310). As previously mentioned, TAU requests may be transmitted, by UEs, such as by M2M devices 205, based on periodic expiration of the TAU timer (the T3412 timer) or based on an M2M device changing TAs. MME 225 may receive the TAU request and may perform processes and/or log information relating to the TAU request. For example, the TAU request may include information, such as: identifier(s) of the M2M device, an indication of the last visited TA, EPS bearer context status, or other information. MME 225 may be able to determine whether a particular TAU request corresponds to an M2M device or a non-M2M device (e.g., based on user information obtained from HSS 235, which may store identifiers of which devices are M2M devices). In one implementation, MME 225 may initially make a determination of whether a particular TAU request is received from an M2M device (e.g., based on information received from HSS 235).

Process 300 may further include comparing a location associated with the TAU request with the last reported location of the M2M device (block 320). In one implementation, the comparison of the "location" may be a comparison of the current TA to which the M2M device is connected with the last reported TA (e.g., a TA that was included in the last TAU request). In other implementations, the comparison may be based on other information, such as a geographical location of the M2M device or the base station to which the M2M device is attached. The comparison may generally relate to whether the TAU request indicates movement or non-movement of the M2M device (relative to the location of the M2M device at the last TAU request).

When the location associated with the TAU request is different than the location associated with the last reported location of the M2M device (block 320—"Different"), process 300 may include updating the location of the M2M device (block 330). For example, MME 225 may update an internal value to indicate the current TA and/or geographical location of the M2M device. This situation may correspond to the scenario in which M2M device 205 attaches to a base station that is associated with a different TA than the previous TA to which M2M device 205 was attached.

Process 300 may further include resetting the TAU timer value to the default value (block 340). The default value may be the initial TAU timer value that is assigned to all UEs that connect to the wireless network. For example, the default value may be 54 minutes. In one implementation, MME 225 may transmit a TAU ACCEPT message, in response to the received TAU request, to the M2M device. The TAU ACCEPT message may include the new value (e.g., 54 minutes) for the TAU timer value. The M2M device may receive and begin to use the new value for the TAU timer.

When the location associated with the TAU request is not different than the location associated with the last reported location of the M2M device (block 320—"Same"), process 300 may include performing a dynamic TAU update procedure to potentially modify the TAU timer value (block 350). The dynamic TAU update procedure may be performed by dynamic TAU update component 227. Dynamic TAU update component 227 may monitor the TAU timer periods from M2M devices 205 and gradually increase the TAU timer value when an M2M device is determined to be stationary. For example, in one implementation, dynamic TAU update component 227 may implement an update function that monotonically increases the TAU timer value based on the length of non-movement (e.g., based on a number of consecutive TAU requests that are received without a location change) of the M2M device. As one example of the operation of dynamic TAU update component 227 of a monotonically increasing function, dynamic TAU update component 227 may linearly increase the TAU timer value of an M2M device based on the number of consecutively received TAU requests that are received without a change in the location of the M2M device.

As another example, dynamic TAU update component 227 may implement an update function that increases the TAU timer value in a step-wise manner, in which there are at least three different possible TAU timer values (steps). As one example of the operation of dynamic TAU update component 227 of a step-wise update function, if the timer period, for a particular M2M device does not change over a first time frame (e.g., one day), dynamic TAU update component 227 may increase the default TAU timer period for the particular M2M device (e.g., 54 minutes) to a second TAU timer period value (e.g., one day). If the second timer period value, for the particular M2M device, continues to not change over a second time frame (e.g., one week), dynamic TAU update component 227 may increase the TAU timer period for the particular M2M device to a third TAU timer period value (e.g., one week). In this manner, MME 225 may gradually increase the TAU timer period, for a particular M2M device, based on the history of TAU requests that are received from the M2M device. One particular implementation of the dynamic TAU update procedure, as performed by dynamic TAU update component 227, will be described in more detail below with reference to FIG. 4.

Process 300 may further include setting the TAU timer value to the value determined by the dynamic TAU update procedure (block 360). For example, MME 225 may transmit a TAU ACCEPT message, in response to the received TAU request, to the M2M device. The TAU ACCEPT message may include the updated value for the TAU timer.

Figure 4:
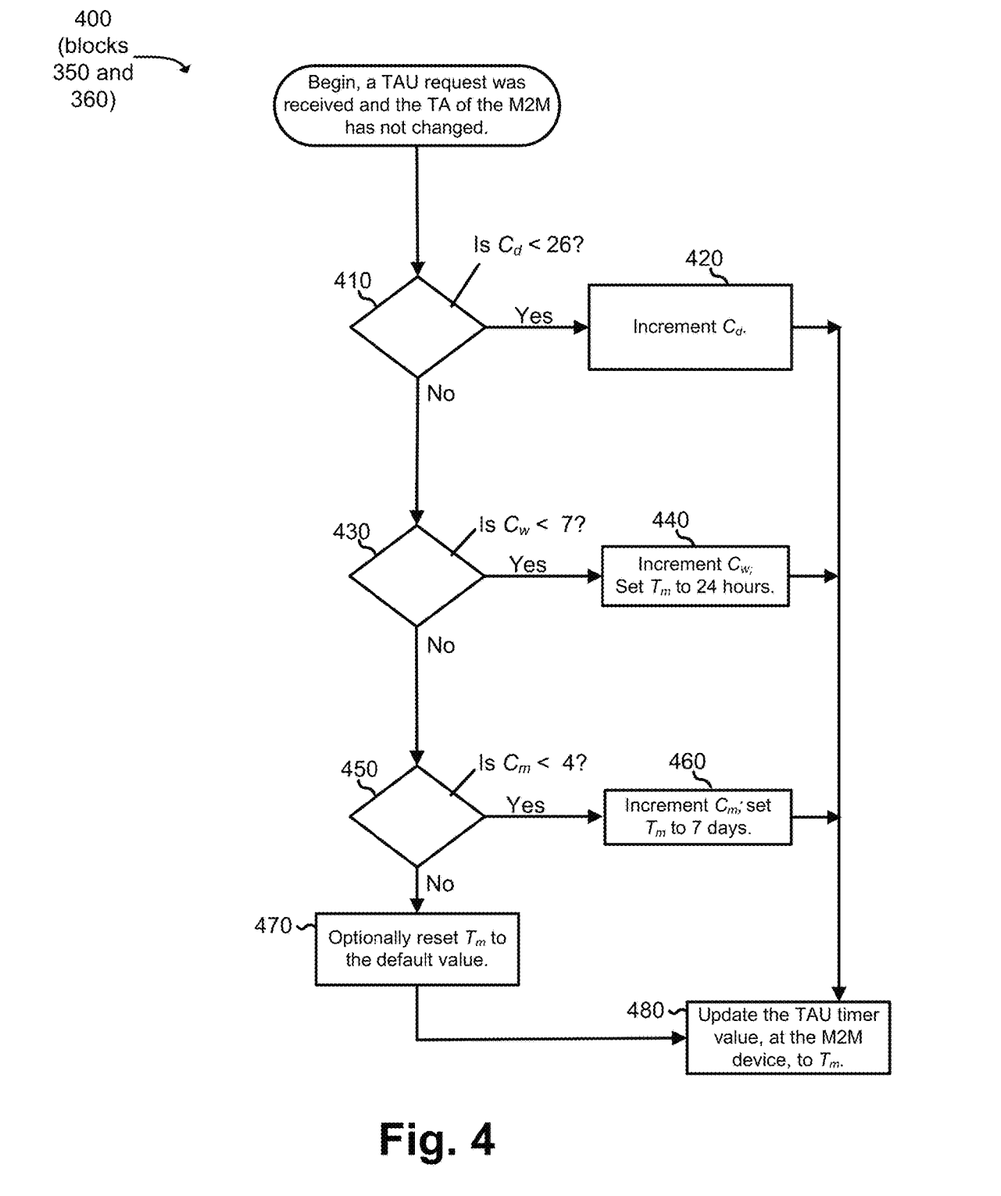
FIG. 4 is a diagram illustrating an example process for dynamically updating the value of TAU timers.

FIG. 4 is a diagram illustrating an example process 400 for dynamically updating the value of TAU timers that are associated with M2M devices 205. Process 400 may be performed, for example, by one or more components associated with the wireless network, such as by MME 225 and/or dynamic TAU update component 227. Process 400 may generally correspond to one particular implementation of blocks 350 and 360 (FIG. 3).

In the description of process 400, reference is made to the following variables:
  $T_m$: the current value of the TAU timer;
  $C_d$: a first counter that indicates a number of TAU requests made (the "daily" counter);
  $C_w$: a second counter that indicates a number of TAU requests (the "weekly" counter); and
  $C_m$: a third counter that indicates a number of TAU requests (the "monthly" counter).
At the beginning of process 300/400, or whenever the TAU timer value is reset (e.g., at block 340), $T_m$ may be reset to the default value, and $C_d$, $C_w$, and $C_m$ may be set to zero. Additionally, in process 400, dynamic modification of the TAU timers is described using modification periods of approximately one day, one week, and one month. In alternate implementations, other modification periods, or additional or fewer modification periods, may be used. In the description of process 400, the initial value for $T_m$ will be set to 54 minutes (e.g., the default value of the TAU timer may be set at 54 minutes by the network operator).

Process 400 may be performed when a TAU request is received, from an M2M device, and when a location associated with the TAU request is the same as the last reported location of the M2M device (e.g., the M2M device is in the same TA). Process 400 may include comparing the value of $C_d$ to a first threshold (block 410). In process 400, the first threshold may be set based on the desire to monitor the default TAU request period for one day before potentially increasing the TAU timer value. The first threshold may thus be set to 26 (1 day/54 minutes is approximately 26). When $C_d$ is less than the first threshold (e.g., 26), process 400 may include incrementing $C_d$ (i.e., by setting the value of $C_d$ to $C_d+1$) (block 420). The current TAU timer value may not be modified. When, however, $C_d$ is greater than or equal to the first threshold (block 410—No), process 400 may include comparing $C_w$ to a second threshold (block 430). In process 400, the second threshold may be set based on the desire to monitor TAU requests, when the TAU timer period is set to one day, for approximately one week (1 week/1 day=7). The second threshold may thus be set to 7 (1 week/1 day=7).

When $C_w$ is less than 7 (block 430—Yes), process 400 may include incrementing $C_w$ and setting the current TAU timer value, $T_m$, to 24 hours (i.e., 1440 minutes) (block 440). When $C_w$ is not less 7 (block 430—No), process 400 may include comparing $C_m$ to a third threshold (block 450). The third threshold may be set based on the desire to monitor TAU requests, when the TAU timer period is set to 7 days, for approximately one month. The third threshold may thus be set to 4 (1 month/7 days is approximately 4). When $C_m$ is less than 4 (block 450—Yes), process 400 may include setting the current TAU timer value, $T_m$, to 7 days (i.e., 10080 minutes) and incrementing $C_m$ (block 460).

In some implementations, it may be desirable to occasionally reset the value of the TAU timer back to the default value (e.g., 54 minutes), such as to ensure that the M2M device is still present and operating correctly in the wireless network. Accordingly, process 400 may further include, when $C_m$ is greater than or equal to 4 (block 450—No), setting $T_m$ to the default value (block 470). In the example of process 400, block 470 may be reached after approximately a month of stationary operation by an M2M device. The variables $C_d$, $C_w$, and $C_m$ may also be reset to zero (block 470).

Process 400 may further include, subsequent to blocks 420, 440, and 460, updating the TAU timer value, at the M2M device, to the value of $T_m$ (block 485). For example, MME 225 may transmit a TAU ACCEPT message, in response to the received TAU request, to the M2M device. The TAU ACCEPT message may include the updated value for the TAU timer. In situations in which $T_m$ is unchanged from the previous iteration of block 495, the TAU ACCEPT message may either include the unchanged value of $T_m$ or omit the time timer value.

Figure 5:
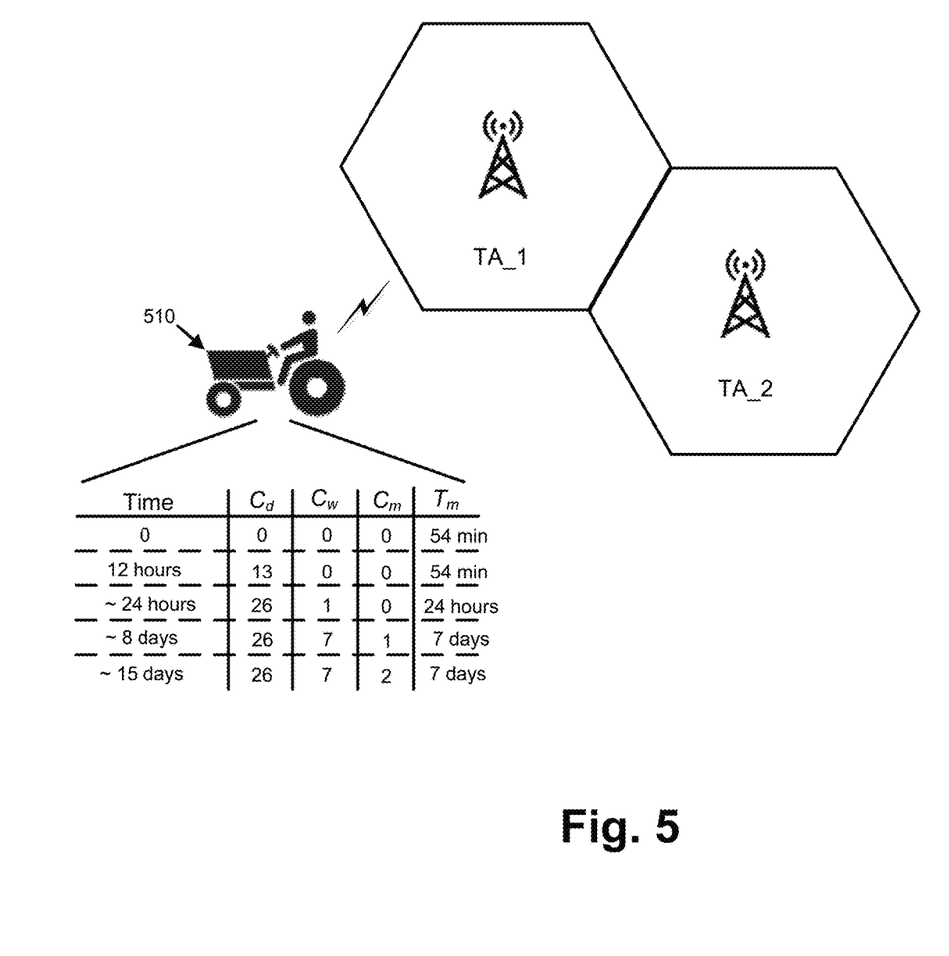
FIG. 5 is a diagram illustrating one example application of dynamic modification of a TAU timer value for an M2M device.

FIG. 5 is a diagram illustrating one example application of dynamic modification of the TAU timer value for an M2M device, in which the dynamic modification is performed based on process 400. In the example of FIG. 5, assume M2M device 510 is an M2M device that operates in the context of an agricultural setting. For example, M2M device 510 may be installed in a tractor or other farm vehicle, and may automatically upload location information of the vehicle, information relating to a crop being harvested, or sensor data obtained from sensors associated with the vehicle. As another example, M2M device 510 may upload images of a particular crop, sensor data relating to field conditions, or other agricultural data. In this example, assume M2M device 510 stays within a single TA (TA_1).

When M2M device 510 first attaches to the wireless network, the TAU timer (the T3412 timer) of M2M device 510 may be set at an initial default value for the wireless network, such as 54 min. Time zero, as shown in FIG. 5, may correspond to the time when M2M device 510 first attaches to the wireless network or whenever the TAU timer value is reset to the default value (e.g., as performed in blocks 340 and/or 495). At this point, $T_m$ may be set to 54 minutes and $C_d$, $C_w$, and $C_m$ may be set to zero.

During the first day of operation of M2M device 510, M2M device 510 may initiate TAU requests every 54 minutes. At each TAU request, MME 225 may increment $C_d$ (block 410). Thus, after approximately 12 hours, $C_d$ may have a value of 13. After approximately 24 hours, $C_d$ may be incremented to the first threshold (e.g., 26), which may cause the counter $C_w$ to be incremented and the value of $T_m$ to be set to 24 hours (blocks 430 and 440). The TAU timer, at M2M device 510, may correspondingly be updated to match $T_m$ (block 495, such as via a TAU ACCEPT message). For the next week, M2M device 510 may thus transmit TAU requests every 24 hours, potentially conserving radio resources relative to the default situation in which TAU requests are transmitted every 54 minutes.

After approximately 8 days, $C_w$ may be incremented to the second threshold (e.g., above 7), which may cause the counter $C_m$ to be incremented and the value of $T_m$ to be set to 7 days (blocks 450 and 460). The TAU timer, at M2M device 510, may correspondingly be updated to match $T_m$ (block 480). At this point, M2M device 510 may begin to transmit TAU requests every 7 days. Additional radio resources may be conserved relative to the situation in which TAU requests are transmitted every 24 hours. If, at any point, M2M device 510 transmits a TAU request that is initiated based on movement of M2M device 510 (e.g., not based on expiration of the TAU timer), the TAU timer value may be reset to the default value and the counter values reset to zero (i.e., a reset to time zero).

Figure 6:
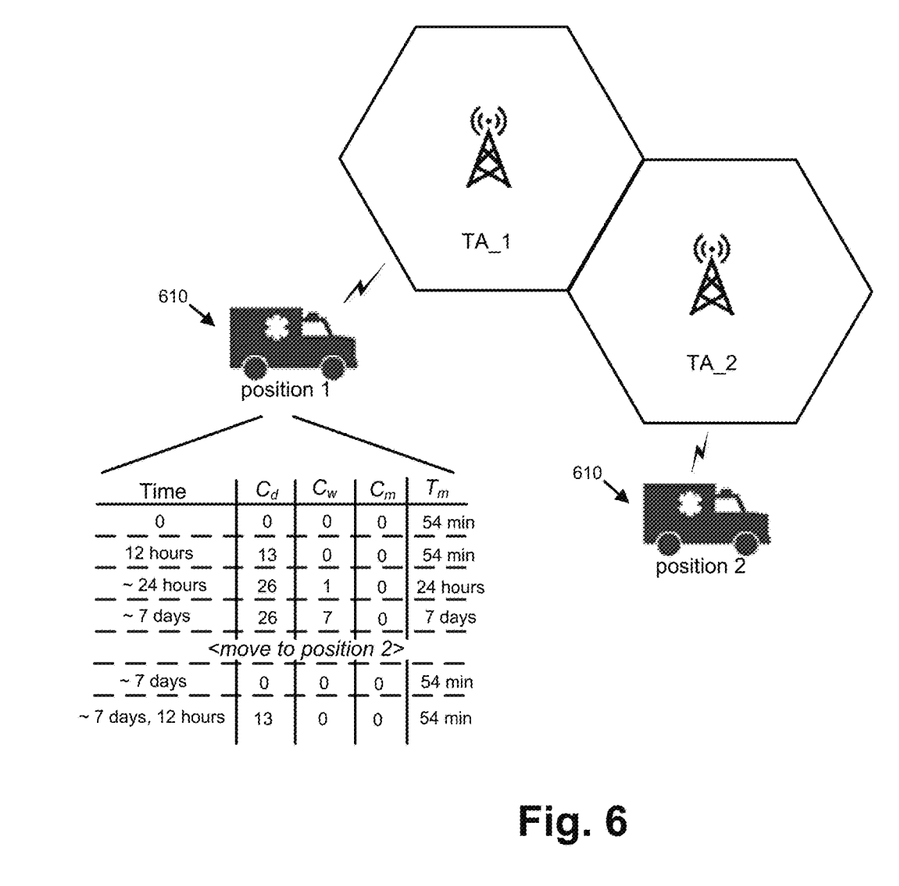
FIG. 6 is a diagram illustrating another example application of dynamic modification of a TAU timer value for an M2M device.

FIG. 6 is a diagram illustrating another example application of dynamic modification of the TAU timer value for an M2M device. In the example of FIG. 6, assume M2M device 610 is an M2M device that operates in the context of a vehicle that moves significant distances. For example, M2M device 610 may include a telematics device installed in a vehicle, such as a car or truck. M2M device 610 may generally operate to gather and transmit data, using a wireless cellular network, that relates to the operation of the vehicle. For example, M2M device 610 may receive sensor data from an onboard diagnostic (OBD) component of the vehicle. Alternatively or additionally, M2M device 610 may receive location information, such as GPS coordinates, relating to the position of the vehicle. M2M device 610 may upload this information via the wireless cellular network. In this example, assume M2M device 610 may be at a first location ("position 1") and be initially attached to base station associated with TA_1.

When M2M device 610 first attaches to the wireless network, the TAU timer (e.g., the T3412 timer) of M2M device 610 may be set at an initial default value for the wireless network. As illustrated, at this point, $T_m$ may be set to 54 minutes, and $C_d$, $C_w$, and $C_m$ may be set to zero.

M2M device 610 may initially be relatively stationary. For example, the vehicle associated with M2M device 610 may remain in a parking lot for a week. During this time, the values of the variables $C_d$, $C_w$, $C_m$, and $T_m$ may vary similarly to the corresponding variables for M2M device 610. That is, after approximately 12 hours, $C_d$ may have a value of 13. After approximately 24 hours, $C_d$ may be incremented to the first threshold (e.g., 26), which may cause the counter $C_w$ to be incremented and the value of $T_m$ to be set to 24 hours (blocks 430 and 440). After approximately 7 days, $C_d$ may have a value of 26 and $C_w$ may have a value of 7.

In this example, after approximately 7 days, M2M device 610 may move to a location ("position 2") that causes M2M device 610 to attach to a base station associated with TA_2. Accordingly, in response to the change in TAs, M2M device 610 may initiate a TAU request. The TAU request may indicate a change in location of M2M device 610, which may cause MME 225 to update the location of the M2M device and reset the TAU timer value to the default value (blocks 330 and 340). For example, MME 225 may communicate a TAU ACCEPT message that resets the TAU timer, of M2M device 610, to 54 minutes. The variables $C_d$, $C_w$, and $C_m$ may be reset to zero and $T_m$ may be reset to 54 minutes. At this point, the state of M2M device 610, with respect to the dynamic updating of the TAU period, may be identical to the state at time zero. Thus, after approximately 12 additional hours (i.e., at approximately 7 days and 12 hours), $C_d$ may have a value of 13.

Figure 7:
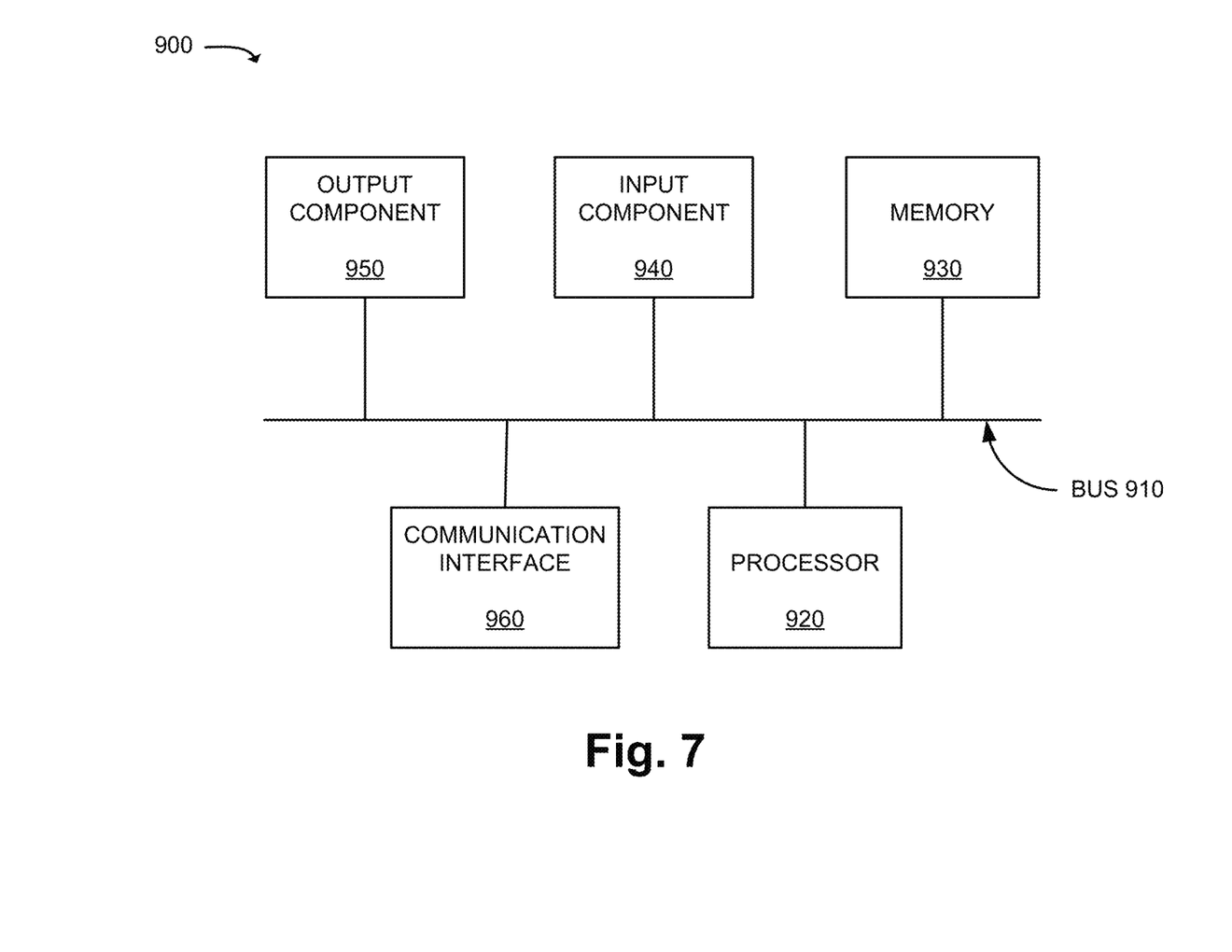
FIG. 7 is a diagram illustrating example components of a device.

FIG. 7 is a diagram of example components of device 700. One or more of the devices illustrated in FIGS. 1, 2, 5 and 6 may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include processing logic, such as a processor, microprocessor, or other logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, a radio interface, or the like. Communication interface 760 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 3 and 4, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, implemented by one or more network devices associated with a wireless cellular network, the method comprising:
    receiving a Tracking Area Update (TAU) request from User Equipment associated with the wireless cellular network;
    determining, by the one or more network devices, whether the User Equipment is associated with a machine-to-machine (M2M) device;
    determining, by the one or more network devices and when the User Equipment is associated with the M2M device, whether the TAU request indicates movement of the M2M device;
    calculating, by one or more network devices, when the User Equipment is determined to be associated with the M2M device and when the TAU request does not indicate movement of the M2M device, an updated TAU period for the M2M device, the updated TAU period being calculated based on an amount of consecutive TAU requests that have been received without movement of the M2M device, wherein calculating the updated TAU period includes increasing the TAU period by successively larger amounts while the TAU requests are received without movement of the M2M device; and
    transmitting, by the one or more network devices, the updated TAU period to the M2M device, for updating a TAU timer at the M2M device.

2. The method of claim 1, wherein determining whether the TAU request indicates movement of the M2M device further includes:
    determining whether a Tracking Area (TA) associated with the M2M device is different than a TA associated with the M2M device at a time of a previous TAU request from the M2M device.

3. The method of claim 1, wherein transmitting the updated TAU period includes transmitting a Tracking Area Update Accept message, including the updated TAU period, to the M2M device.

4. The method of claim 1, wherein calculating the updated TAU period includes increasing the TAU period in a step-wise manner.

5. The method of claim 4, wherein calculating the updated TAU period in the step-wise manner includes:
    incrementing one or more of a plurality of counters, each counter corresponding to different time periods;
    comparing values of the plurality of counters to a corresponding plurality of thresholds; and
    updating the TAU period based on the comparison of the plurality of counters to the plurality of thresholds.

6. The method of claim 5, wherein the plurality of counters includes three counters, and wherein the corresponding different time periods of the plurality of counters include a daily, weekly, and monthly counter.

7. The method of claim 1, wherein the wireless cellular network includes a Long Term Evolution (LTE) based network, and the TAU timer includes the LTE T3412 timer.

8. The method of claim 1, further comprising:
    resetting the TAU period to a default value for the wireless cellular network after a particular period has elapsed without movement of the M2M device.

9. The method of claim 1, wherein the successively larger amounts to increase the TAU period include at least three different values.

10. A network device comprising:
    a non-transitory memory device containing processor executable instructions; and
    processing logic configured to execute the processor-executable instructions, wherein executing the processor-executable instructions causes the network device to:
        receive a Tracking Area Update (TAU) request from User Equipment associated with the wireless cellular network;
        determine whether the User Equipment is associated with a machine-to-machine (M2M) device;
        determine, when the User Equipment is determined to be associated with the M2M device, whether the TAU request indicates movement of the M2M device;
        calculate, when the User Equipment is determined to be associated with the M2M device and when the TAU request does not indicate movement of the M2M device, an updated TAU period for the M2M device, the updated TAU period being calculated based on an amount of consecutive TAU requests that have been received without movement of the M2M device, wherein calculating the updated TAU period includes increasing the TAU period by successively larger amounts while the TAU requests are received without movement of the M2M device; and
        transmit the updated value of the TAU period to the M2M device.

11. The network device of claim 10, wherein determining whether the TAU request indicates movement of the M2M device further includes:
determining whether a Tracking Area (TA) associated with the M2M device is different than a TA associated with the M2M device at a time of a previous TAU request from the M2M device.

12. The network device of claim 10, wherein transmitting the updated TAU period includes transmitting a Tracking Area Update Accept message, including the updated TAU period, to the M2M device.

13. The network device of claim 10, wherein calculating the updated TAU period includes increases the TAU timer value in a step-wise manner.

14. The network device of claim 13, wherein calculating the updated TAU timer value in the step-wise manner includes:
incrementing one or more of a plurality of counters, each counter corresponding to different time periods;
comparing values of the plurality of counters to a corresponding plurality of thresholds; and
updating the TAU timer value based on the comparison of the plurality of counters to the plurality of thresholds.

15. The network device of claim 10, wherein the network device further includes processing logic to:
reset the TAU timer value to a default value for the wireless cellular network after a particular period has elapsed without movement of the M2M device.

16. The network device of claim 10, wherein the successively larger amounts to increase the TAU period include at least three different values.

17. A mobility management entity (MME) associated with an Evolved Packet System of a wireless network, the MME comprising:
a non-transitory memory device containing processor executable instructions; and
one or more processors configured to execute the processor-executable instructions, wherein executing the processor-executable instructions causes the MME to:
receive a Tracking Area Update (TAU) request from a machine-to-machine (M2M) device associated with a wireless network;
determine an updated TAU period for the M2M device based on application of a function that increases a current value of the TAU period when a predetermined threshold amount of consecutive TAU requests have been received without movement of the M2M device, wherein a plurality of predetermined thresholds are defined and each of the plurality of predetermined thresholds correspond to a different updated TAU period, and wherein the different updated TAU periods increase by successively larger amounts for successive ones of the plurality of predetermined thresholds; and
transmitting the updated value of the TAU period to the M2M device.

18. The MME of claim 17, wherein transmitting the updated value of the TAU period includes transmitting a Tracking Area Update Accept message, including the value of the TAU period, to the M2M device.

19. The MME of claim 17, wherein the wireless cellular network includes a Long Term Evolution (LTE) based network and the TAU timer includes the LTE T3412 timer.

20. The MME of claim 17, wherein the one or more processors are further configured to execute the processor-executable instructions to:
reset the TAU period to a default value for the wireless network after a particular period has elapsed without movement of the M2M device.

* * * * *